US010593299B2

(12) United States Patent
Valo

(10) Patent No.: US 10,593,299 B2
(45) Date of Patent: Mar. 17, 2020

(54) COMPUTER-IMPLEMENTED METHOD FOR REDUCING VIDEO LATENCY OF A COMPUTER VIDEO PROCESSING SYSTEM AND COMPUTER PROGRAM PRODUCT THERETO

(71) Applicant: Picturall Oy, Kaustinen (FI)

(72) Inventor: Samuli Valo, Kaustinen (FI)

(73) Assignee: Picturall Oy, Kaustinen (FI)

( * ) Notice: Subject to any disclaimer, the term of this patent is extended or adjusted under 35 U.S.C. 154(b) by 0 days.

(21) Appl. No.: 16/303,180

(22) PCT Filed: May 27, 2016

(86) PCT No.: PCT/FI2016/050372

§ 371 (c)(1), (2) Date: Nov. 20, 2018

(87) PCT Pub. No.: WO2017/203096

PCT Pub. Date: Nov. 30, 2017

(65) Prior Publication Data

US 2019/0189085 A1 Jun. 20, 2019

(51) Int. Cl.

| | |
|---|---|
| ***G06T 1/20*** | (2006.01) |
| ***G09G 5/36*** | (2006.01) |
| ***G09G 5/393*** | (2006.01) |
| ***G09G 5/395*** | (2006.01) |
| ***G09G 5/42*** | (2006.01) |

(52) U.S. Cl.

CPC ............... *G09G 5/363* (2013.01); *G06T 1/20* (2013.01); *G09G 5/393* (2013.01); *G09G 5/395* (2013.01); *G09G 5/42* (2013.01)

(58) Field of Classification Search

CPC .......... G06T 1/20; G09G 5/363; G09G 5/393; G09G 5/395; G09G 5/42

USPC .................................................. 345/501, 503

See application file for complete search history.

(56) References Cited

U.S. PATENT DOCUMENTS 7,522,167 B1 * 4/2009 Diard .................... G06T 15/005 345/502
7,525,547 B1 * 4/2009 Diard ........................ G06T 1/20 345/502
7,525,548 B2 * 4/2009 Azar ......................... G06F 3/14 345/502
7,629,978 B1 * 12/2009 Diard .................... G06F 9/3879 345/502

(Continued)

OTHER PUBLICATIONS

Kniss, Joe et al., Interactive Texture-Based Volume Rendering for Large Data Sets, IEEE Computer Graphics and Applications, Jul. 31, 2001, pp. 52-61, vol. 21 issue 4, IEEE, New York, NY, USA.

*Primary Examiner* — Jacinta M Crawford
(74) *Attorney, Agent, or Firm* — Berggren LLP

(57) ABSTRACT

The invention relates to a computer-implemented method for reducing video latency and computer program product thereto for a computer video processing system. Two separate threads, an input thread and an output thread, are created and configured to run simultaneously and independently from each other. The input thread is configured to process video input frames that may be split into a plurality of input slices. The output thread is configured to process video output frames. The video output frames may also be split into a plurality of output slices.

16 Claims, 4 Drawing Sheets

(56) References Cited

U.S. PATENT DOCUMENTS 7,633,505 B1 * 12/2009 Kelleher .................. G06T 1/20 345/502
8,106,913 B1 * 1/2012 Diard ....................... G06T 1/20 345/502
8,217,951 B2 * 7/2012 Jung ...................... G06F 9/505 345/502
8,339,404 B2 * 12/2012 Pryor ................... G06F 9/5044 345/501
8,400,458 B2 * 3/2013 Wu .......................... G06T 1/00 345/501
8,941,669 B1 * 1/2015 Moreton ................ G06F 9/505 345/502
9,247,264 B2 1/2016 Franche
2005/0012749 A1 1/2005 Gonzalez
2005/0041031 A1 * 2/2005 Diard ................... G06T 15/005 345/505
2006/0267988 A1 * 11/2006 Hussain ................... G06T 1/20 345/502
2006/0267989 A1 * 11/2006 Campbell ................ G06T 1/20 345/502
2006/0267992 A1 * 11/2006 Kelley ............... G06F 9/30069 345/502
2006/0271717 A1 * 11/2006 Koduri ..................... G06F 9/52 710/241
2007/0294458 A1 * 12/2007 Danilak ............. G06F 13/4027 710/313
2008/0079733 A1 * 4/2008 Benson ................. H04N 19/61 345/502
2008/0117220 A1 * 5/2008 Gorchetchnikov ... G06F 9/5027 345/503
2008/0211816 A1 9/2008 Gonzalez
2010/0246662 A1 9/2010 Koto
2012/0173847 A1 * 7/2012 Moy .................... G06F 9/3009 712/32
2015/0212890 A1 * 7/2015 Sudharsanan ....... G06F 11/1433 714/11

* cited by examiner

COMPUTER-IMPLEMENTED METHOD FOR REDUCING VIDEO LATENCY OF A COMPUTER VIDEO PROCESSING SYSTEM AND COMPUTER PROGRAM PRODUCT THERETO

PRIORITY

This application is a U.S national application of the international application number PCT/FI2016/050372 filed on May 27, 2016 the contents of which are incorporated herein by reference.

TECHNICAL FIELD OF THE INVENTION

The invention relates to a computer-implemented method for reducing video latency and computer program product thereto in a computer video processing system.

BACKGROUND OF THE INVENTION

In general, latency in delivering video content is understood as the time between sending the video content from a video input source and displaying the video content on a video output display. Various methods and specifically device-based solutions for reducing video latency have presented in the past. However, video latency still remains as a problem in all kinds of video content delivery and broadcasting in case of computer video processing systems.

In the past solutions drawing the video content takes place in a back buffer. The past solutions will wait until input side has completely received one input frame, then move the received input frame from input side to CPU (central processing unit, processor) and/or main memory via DMA transfer and memcopy functions. After that the past solutions move the frame forward from CPU to GPU (graphics processing unit) and draw a scene into the back buffer. The past solutions will swap front buffer and back buffer so that GPU starts outputting the new front buffer after the next vertical blanking interval. Front buffer contains the output frames that are currently being sent to video output display. Front frame buffer is being sent to output starting from topmost part of the frame buffer and then continuing to the bottom of the frame. While the front buffer is supplying rendered images to the display, the back buffer is used to store images that are in the process of being rendered by the video graphics circuitry. Once the video graphics circuitry has completed the rendered of the current images and the fully rendered images in the front buffer have been provided to the display, the front and back buffers are flipped. As such, the previous front buffer now becomes the back buffer and is used to store new images as they are rendered while the back buffer provides the rendered images that it stores to the display driver. The front and back buffers continually flip in this manner, which occurs during the blanking interval of the video data such that tearing (i.e., a visible separation of images) does not occur. Typically, the buffers flip at the refresh rate of the display (e.g., 50 Hz, 60 Hz, 75 Hz, and 90 Hz), which is in synchronization with the video graphics circuitry rendering a new frame of data (i.e., images). These solutions are robust and simple but come with more latency and usually drawing will take more time so that the latency varies from two to three frames.

In the past, solutions for reducing video latency have been strongly device and hardware based causing these solutions to be expensive and requiring significant investments in infrastructure. Results that are on the same with present invention have been reached only with hardware based solutions. An effective solution for reducing video latency in computer video processing systems is needed.

SUMMARY OF THE INVENTION

The object of the present invention is to provide a solution that enable video latency to be reduced from two or three frames to one or two frames in computer video processing systems. The object of the present invention is to provide a computer-implemented for reducing video latency and computer program product thereto that enable video latency to be reduced from two or three frames to one or two frames in computer video processing systems.

Also, the object of the present invention is to provide a solution that enables video latency to be reduced from two frames to one frame in computer video processing systems.

Further, the object of the present invention is to provide a solution that enable video latency to be reduced from three frames to one or two frames in computer video processing systems.

Finally, the object of the present invention is to provide a solution for reducing video latency in computer video processing systems that is cost effective and allows reducing video latency in computer video processing systems without significant investment in hardware.

The objects of the present invention are fulfilled by providing a computer-implemented method for reducing video latency and computer program product thereto in a computer video processing system.

One aspect of the invention is a computer-implemented method for reducing video latency of a computer video processing system comprising at least one video input source, at least one processor, at least one memory including a computer program code, at least one video input card, at least one graphics processing unit known as GPU and at least one video output display, the method comprising

- creating an input thread and an output thread by the at least one processor
- configuring the input thread and the output thread to run simultaneously and independently from each other by the at least one processor
- choosing a manner of splitting at least one video input frame received from the at least one video input source via the at least one video input card into a plurality of input slices from $S_{i1}$ to $S_{in}$ where a single input slice is known as $S_{ix}$ by the at least one processor on the input thread; and
- choosing a manner of splitting at least one video output frame into a plurality of output slices from $S_{O1}$ to $S_{On}$ where a single output slice is known as $S_{ox}$ via the at least one GPU by the at least one processor on the output thread wherein the method further comprises
- on the input thread
  - calculating a start time and an end time for each single input slice $S_{ix}$ of the input slices $S_{i1}$ to $S_{in}$ of the at least one input frame received from the at least one video input card by the at least one processor,
  - locating vertical blanking interval for the at least one video input card by the at least one processor,
  - receiving at least one single input slice $S_{ix}$ of the plurality of input slices from Si1 to Sin from the at least one video input source via the at least one video input card by the at least one processor until all input slices from $S_{i1}$ to $S_{in}$ have been received, and sending the received at least one single input slice $S_{ix}$ to the output thread by the at least one processor until all input slices from $S_{i1}$ to $S_{in}$ have been sent to the output thread; and simultaneously on the output thread calculating a start time and an end time for each output slice $S_{ox}$ of $S_{O1}$ to $S_{On}$ for the at least one GPU by the at least one processor, configuring the at least one GPU to draw directly to a front buffer by the at least one processor, calculating a required latency on the basis of positioning the at least one video input frame within the at least one video output frame by the at least one processor, locating vertical blanking interval for the at least GPU by the at least one processor;

receiving the at least one single input slice $S_{ix}$ of the input slices $S_{i1}$ to $S_{in}$ sent from the input thread by the at least one processor;

calculating a required at least one input slice $S_{iy}$, wherein y is from 1 to n, comprising at least one of the input slices from $S_{i1}$ to $S_{in}$ for drawing output slices $S_{O1}$ to $S_{On}$ for the at least one GPU by the at least one processor on the basis of positioning of the at least one video input frame within the at least one video output frame;

waiting until the input thread has received all the plurality of input slices from Si1 to Sin from the at least one video input card by the at least one processor; and drawing by the at least one processor the required input slices $S_{i1}$ to $S_{in}$ for the output slices $S_{O1}$ to $S_{On}$ for the at least one GPU where a single output slice $S_{o(x+1)}$ consisting of the required input slices from $S_{i1}$ to $S_{in}$ is drawn before the at least one GPU completes sending a single output slice $S_{ox}$ of output slices from $S_{O1}$ to $S_{On}$ corresponding to the required at least one input slice $S_{iy}$ to the at least one video output display until the last output slice $S_{on}$ corresponding to the required at least one input slice $S_{iy}$ is sent by the at least one GPU to the at least one video output display.

Another aspect of the invention is a computer program product on a non-transitory media for reducing video latency of a computer video processing system comprising at least one video input source, at least one processor, at least one memory including a computer program code, at least one video input card, at least one graphics processing unit known as GPU and at least one video output display, the computer program product comprising:

a computer readable code for creating an input thread and an output thread by the at least one processor a computer readable code for configuring the input thread and the output thread to run simultaneously and independently from each other by the at least one processor a computer readable code for choosing a manner of splitting at least one video input frame received from the at least one video input source via the at least one video input card into a plurality of input slices from $S_{i1}$ to $S_{in}$ where a single input slice is known as $S_{ix}$ by the at least one processor on the input thread and a computer readable code for choosing a manner of splitting at least one video output frame into a plurality of output slices from $S_{O1}$ to $S_{On}$ where a single output slice is known as $S_{ox}$ via the at least one GPU by the at least one processor on the output thread wherein the computer program product further comprises a computer readable code for calculating a start time and an end time for each single input slice $S_{ix}$ of the input slices $S_{i1}$ to $S_{in}$ of the at least one input frame received from the at least one video input card by the at least one processor on the input thread a computer readable code for locating vertical blanking interval for the at least one video input card by the at least one processor on the input thread a computer readable code for receiving at least one single input slice $S_{ix}$ of the plurality of input slices from Si1 to Sin from the at least one video input source via the at least one video input card by the at least one processor until all input slices from $S_{i1}$ to $S_{in}$ have been received on the input thread a computer readable code for sending the received at least one single input slice $S_{ix}$ to the output thread by the at least one processor until all input slices from $S_{i1}$ to $S_{in}$ have been sent to the output thread on the input thread a computer readable code for calculating a start time and an end time for each output slice $S_{ox}$ of $S_{O1}$ to $S_{On}$ for the at least one GPU by the at least one processor on the output thread a computer readable code for configuring the at least one GPU to draw directly to a front buffer by the at least one processor on the output thread a computer readable code for calculating a required latency on the basis of positioning the at least one video input frame within the at least one video output frame by the at least one processor on the output thread a computer readable code for locating vertical blanking interval for the at least GPU by the at least one processor on the output thread a computer readable code for receiving the at least one single input slice $S_{ix}$ of the input slices $S_{i1}$ to $S_{in}$ sent from the input thread by the at least one processor on the output thread a computer readable code for calculating a required at least one input slice $S_{iy}$, wherein y is from 1 to n, comprising at least one of the input slices from $S_{i1}$ to $S_{in}$ for drawing output slices $S_{O1}$ to $S_{On}$ for the at least one GPU by the at least one processor on the basis of positioning of the at least one video input frame within the at least one video output frame on the output thread a computer readable code for waiting until the input thread has received all the plurality of input slices from Si1 to Sin from the at least one video input card by the at least one processor on the output thread, and a computer readable code for drawing by the at least one processor the required input slices $S_{i1}$ to $S_{in}$ for the output slices $S_{O1}$ to $S_{On}$ for the at least one GPU where a single output slice $S_{o(x+1)}$ consisting of the required input slices from $S_{i1}$ to $S_{in}$ is drawn before the at least one GPU completes sending a single output slice $S_{ox}$ of output slices from $S_{O1}$ to $S_{On}$ corresponding to the required at least one input slice $S_{iy}$ to the at least one video output display until the last output slice $S_{on}$ corresponding to the required at least one input slice $S_{iy}$ is sent by the at least one GPU (106) to the at least one video output display on the output thread.

Some advantageous embodiments of the present invention are disclosed in dependent claims.

The basic idea of the invention is as follows: According to the present invention a computer-implemented method for reducing video latency of a computer video processing system and a computer program product thereto are provided. The computer video processing system is understood to comprise at least one video input source, at least one processor, at least one data communication interface, at least one memory including a computer program code, at least one video input card, at least one graphics processing unit known as GPU and at least one video output display. The present invention may be implemented with various hardware components and/or programming languages.

According to the present invention tracking the display signal generation in computer video system to minimize video latency from video input source to output display is carried out both in input side and output side of the system if possible. Either side provides more time to draw with minimal latency. Vertical refresh time to synchronize drawing is detected and optimal latency calculated so that it can be achieved depending on video content ("the image") composition.

Tracking the display signal generation according to the present invention comprises drawing the output frames directly into a front buffer, splitting input and output frames into slices where input and output can have different number of slices and the slices don't need to be of the same size, but input and output slices are required to be smaller or equal to the corresponding vertical resolution. Further, tracking the display signal generation according to the present invention comprises finding a vertical blanking interval. According to the present invention when the GPU is drawing an output slice, it should be ensured that all the needed input slices, one or more, needed for drawing the output slice have been received for the GPU. Drawing may be done separately for each output slice. When one output slice is sent to the video output display over the wire (i.e. a signal cable) by the GPU, it should be ensured that the output slice in question needs to be fully drawn and completed.

Processing of the input frame is started processing it as soon as next frame is completed. Optimal latency is also calculated. If the input frame is moved, rotated and scaled then it should be calculated what is an optimal latency. Also vertical refresh time should be detected. There are many ways to do that: If the system is genlocked then both input and output will have the same refresh time method and either of those can be used. Input refresh time with enough accuracy can be detected by waiting for video input card driver to notify a completed frame. Some video input cards drivers provide a configurable interrupt and/or callback that tells the input scan position. Output side refresh can be detected accurately, for example, with OpenGL NV_delay_before_swap extension.

The present invention in the field of computer-implemented methods for the computer video processing systems requires such video content processing and calculation capacity that is beyond manual skills and capacity of a person skilled in the art. Further, the present invention in the field of computer-implemented methods for the computer video processing systems requires such accurate timing on the processing of the video content that is beyond manual skills and capacity of a person skilled in the art.

In one advantageous embodiment of the invention two separate threads, an input thread and an output thread, are created. The input thread and the output thread are configured to run simultaneously and independently from each other. A manner of splitting at least one video input frame received from the at least one video input source via the at least one video input card into a plurality of input slices from $S_{i1}$ to $S_{in}$ where a single input slice $S_{ix}$ is known as by the at least one processor is chosen on the input thread. Also, a manner of splitting at least one video output frame into a plurality of output slices from SO1 to SOn where a single output slice is known as Sox by the at least one processor via the at least one GPU is chosen on the output thread.

Further, according to this advantageous embodiment of the invention, certain actions are taken on the input thread. Calculating a start time and an end time for each single input slice $S_{ix}$ of $S_{i1}$ to $S_{in}$ of the at least one input frame received from the at least one video input card by the at least one processor is done on the input thread. Locating vertical blanking interval for the at least one video input card by the at least one processor is also executed on the input thread. Receiving at least one single input slice $S_{ix}$ of input slices from $S_{i1}$ to $S_{in}$ from the at least one video input card takes place $S_{i1}$ to $S_{in}$ by the at least one processor. Further, sending the received at least one single input slice $S_{ix}$ to the output thread by the processor until all input slices from $S_{i1}$ to $S_{in}$ have been received and sent to the output thread takes place on the input thread.

Moreover, according to this advantageous embodiment of the invention, certain actions are taken simultaneously with the actions of the input thread on the output thread. Calculating a start time and an end time for each output slice from $S_{O1}$ to $S_{On}$ for the at least one GPU by the at least one processor is done on the output thread. Further, configuring the at least one GPU to draw directly to a front buffer by the at least one processor is also done on the output thread. Further on the output thread a required latency is calculated on the basis of positioning the at least one video input frame within the at least one video output frame by the at least one processor. Vertical blanking interval for the at least one GPU is located by the at least one processor on the output thread. Receiving the at least one single input slice Six of Si1 to Sin sent from the input thread is received by the at least one processor on the output thread for the at least one GPU. Further, input slices from $S_{i1}$ to $S_{in}$ needed for drawing output slices $S_{O1}$ to $S_{On}$ are calculated by the at least one processor on the basis of positioning of the at least one video input frame within the at least one video output frame on the output thread. Waiting until the at least one input thread has received all the plurality of input slices from Si1 to Sin from the at least one video input card via the at least one GPU by the processor may be needed on the output thread. Finally, the required input slices $S_{i1}$ to $S_{in}$ for the output slices $S_{O1}$ to $S_{On}$ for the at least one GPU are drawn by the at least one processor on the output thread wherein a single input slice $S_{ix}$ of input slices from $S_{i1}$ to $S_{in}$ is drawn before the at least one GPU sends a single output slice $S_{ox}$ of output slices from $S_{O1}$ to $S_{On}$ corresponding to the single input slice $S_{ix}$ to the at least one video output display until the last input slice $S_{in}$ is sent by the at least one GPU to the at least one video output display.

In another advantageous embodiment of the invention calculating the start time and the end time for each input slice from $S_{i1}$ to $S_{in}$ of the at least one input frame received from the at least one video input card via the at least one GPU by the at least one processor within a period of a single video input frame takes place on the input thread. Further, calculating the start time and the end time for each input slice from $S_{i1}$ to $S_{in}$ of the at least one input frame received from the at least one video input card via the at least one GPU by the at least one processor within a period of a single video input frame may be done on the output thread.

In the third advantageous embodiment of the invention calculating the start time and an end time for each input slice from $S_{i1}$ to $S_{in}$ of the at least one input frame received from the at least one video input card via the at least one GPU by the at least one processor on the basis of information obtained from the at least one video input card via the at least one GPU may be done on the input thread. Further, calculating the start time and an end time for each input slice from $S_{i1}$ to $S_{in}$ of the at least one input frame received from the at least one video input card via the at least one GPU by the at least one processor on the basis of information obtained from the at least one video input card via the at least one GPU may be executed on the output thread.

In the fourth advantageous embodiment of the invention_drawing a background content for each output slice $S_{O1}$ to $S_{On}$ by the at least one processor on the front buffer may be executed on the output thread. Also, drawing a foreground content for each output slice $S_{O1}$ to $S_{On}$ by the at least one processor on the front buffer may be executed on the output thread. Verifying that drawing the background content is finished within an allowable time limit may be executed by the at least one processor on the output thread. Verifying that drawing of the foreground content is finished within an allowable time limit may be executed by the at least one processor on the output thread. Also, verifying that drawing of the foreground and background content is finished within an allowable time limit may be executed by the at least one processor on the output thread. It should be noted that some inaccuracy may exist in case of timings of computer based systems in general and this applies to the computer video processing systems as well. Due to this certain inaccuracy of timings practical implementation often requires reserving some marginal for all the timings.

Further scope of applicability of the present invention will become apparent from the detailed description given hereafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and accompanying drawings which are given by way of illustration only, and thus are not limitative of the present invention and wherein.

DETAILED DESCRIPTION

In the following description, considered embodiments are merely exemplary, and one skilled in the art may find other ways to implement the invention. Although the specification may refer to "an", "one; or "some" embodiment(s) in several locations, this does not necessarily mean that each such reference is made to the same embodiment(s), or that the feature only applies to a single embodiment. Single feature of different embodiments may also be combined to provide other embodiments.

Figure 1:
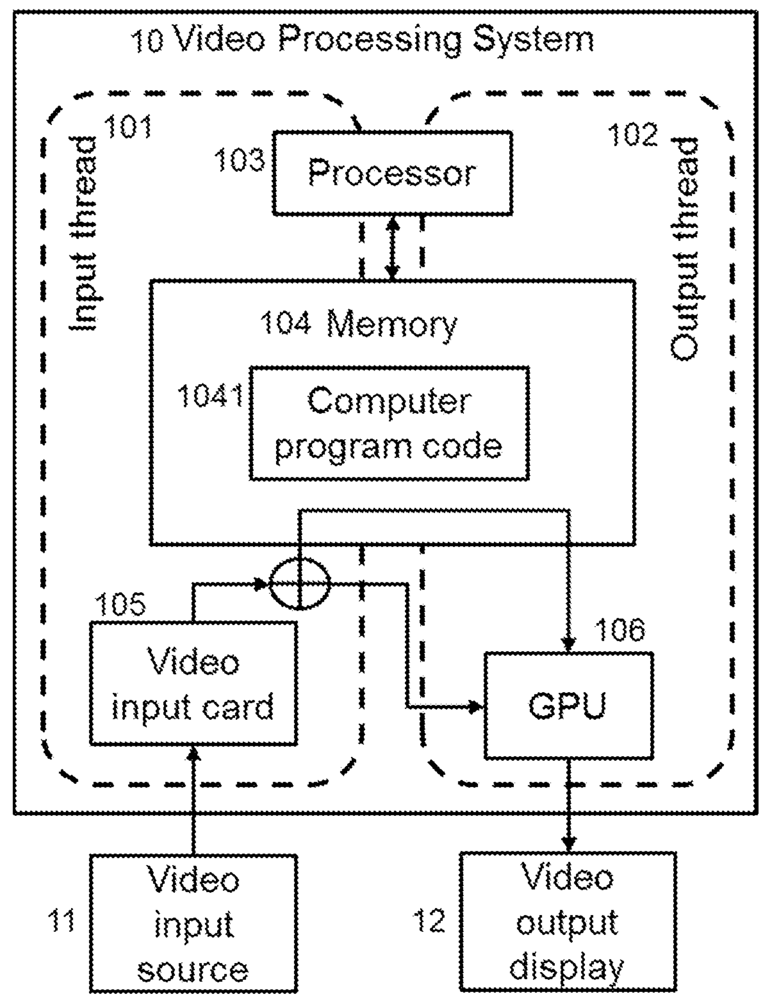
FIG. 1 shows an exemplary schematical representation of a computer video processing system in the context of the present invention.

FIG. 1 shows an exemplary schematical representation of a computer video processing system 10 with at least one video input source 11 and at least one video output display 12 in the context of the present invention. The computer video processing system in the context of the present invention comprises the at least one video input source 11, at least one processor 103, at least one memory 104 comprising a computer program code 1041 for the computer program product according to the invention, at least one video input card 105, at least one graphics processing unit known as GPU 106 and at least one video output display 12. According to the present invention an input thread 101 and an output thread 102 are created for video content processing by the at least one processor 103. According to the present invention an input thread 101 and an output thread 102 are created for video content processing by the at least one processor 103 with the computer program code 1041.

The at least one video input source 11 may be, for example, a camera, a video camera, a mobile device, a computer, a portable device or other such apparatus capable to send video content over a data communication channel to the computer video processing system 10. The video content is received through the at least one video input card 11. The at least one video input card 11 sends the video content via the at least one memory 104 to the at least one GPU 106. The at least one video input card 11 may also send the video content directly to the at least one GPU 106 by the at least one processor 103. Advantageously, the at least GPU 106 may be configured to draw directly to a front buffer containing the video content that is being sent and presented on the at least one video output display 12 at a certain point of time.

The at least one video input card 105 operates on the input thread 101 side of the computer video processing system 10. The at least one GPU 106 operates on the output thread 102 side of the computer video processing system 10. The at least one memory 104 and the computer program code 1041 configured together with the at least one processor 103, may cause the at least one video input card 11 to send the video content via the at least one memory 104 to the at least one GPU 106. The at least one memory 104 and the computer program code 1041 configured together with the at least one processor 103, cause the at least one video input card 11 to send the video content directly to the at least one GPU 106 by the at least one processor 103. The at least one memory 104 and the computer program code 1041 configured to, with the at least one processor 103, may cause the at least GPU 106 to draw directly to a front buffer containing the video content that is being sent and presented on the at least one video output display 12 at a certain point of time.

The at least one memory 104 and the computer program code 1041 are configured together with the at least one processor 103, create the input thread 101 to receive video content from the at least one video input source 11. The at least one memory 104 and the computer program code 1041 are configured together with the at least one processor 103, create the input thread 101 to process video content from the at least one video input source 11. The at least one memory 104 and the computer program code 1041 are configured to, with the at least one processor 103, create the input thread 101 to send video content to the output thread 102. The video content is understood as video image and may also comprise sounds and text, for example. The video content is received as one or more video input frames. The one or more video input frames may be split into a plurality of input slices from $S_{i1}$ to $S_{in}$ where a single input slice is known as $S_{ix}$ by the at least one processor 103 on the input thread 101. On the output thread correspondingly the video content is processed as one or more video output frames. The one or more video output frames may be split into a plurality of output slices from $S_{o1}$ to $S_{on}$ where a single output slice is known as $S_{ox}$ by the at least one processor 103 on the output thread 102.

Video latency in the computer video processing system 10 is understood as a time that is required to present video content received from the at least one video input source 11 on the at least one video output display 12. The at least one video output display 12 may be, for example, a single computer display, a television system, an arrangement of display or other such display system.

Figure 2A:
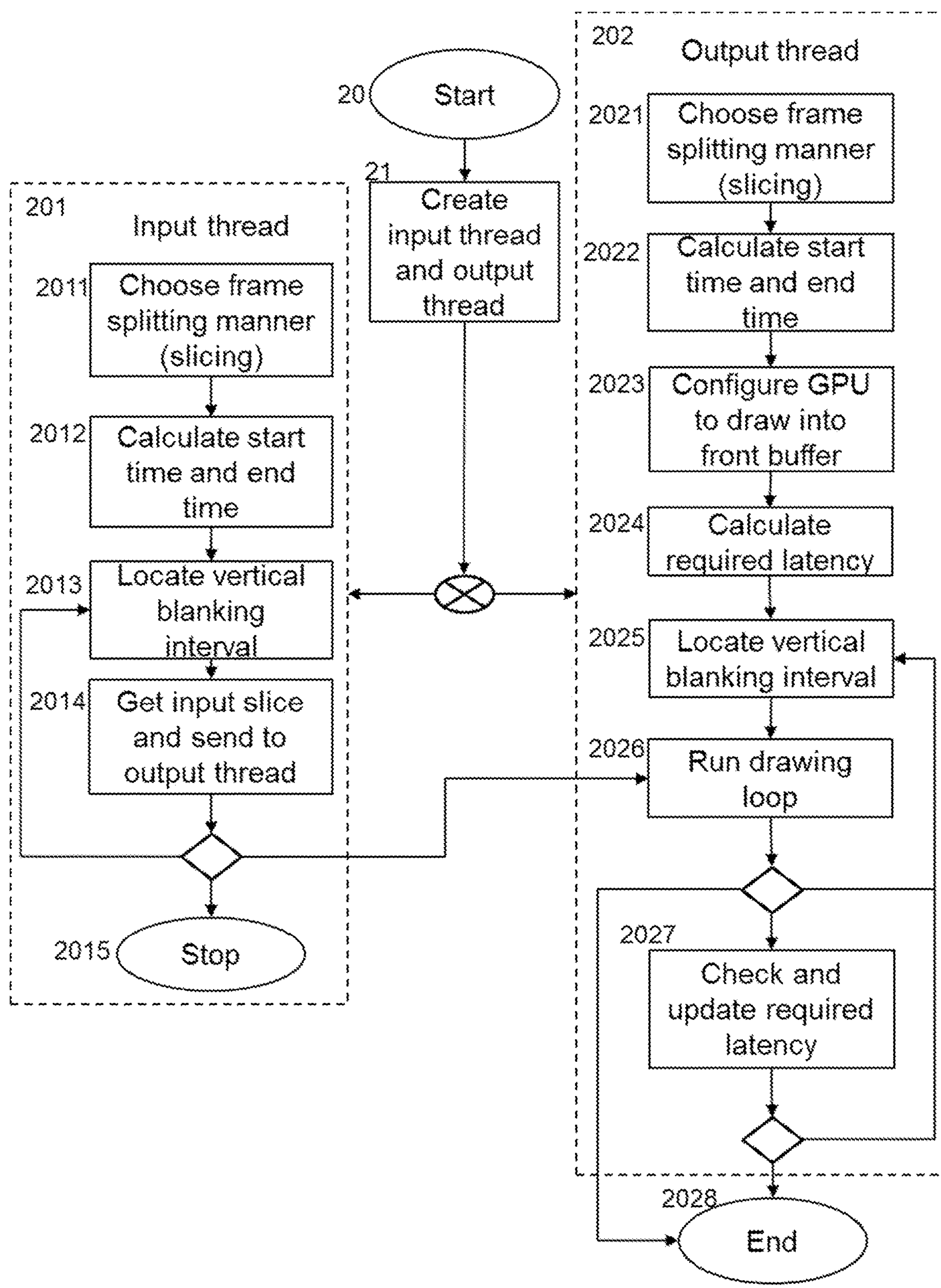
FIG. 2*a* shows an exemplary flow chart representing basic method steps according to the invention.

FIG. 2*a* shows an exemplary flow chart representing the basic method steps according to the invention. References to the components of the set-up according to FIG. 1 are made.

The computer implemented according to the present invention is started in step 20. The computer-implemented method for reducing video latency of the computer video processing system 10 comprising the at least one video input source 11, the at least one processor 103, the at least one memory 104 including the computer program code 1041, the at least one video input card 105, the at least one GPU 106 and the at least one video output display 12 comprises at least the method steps herein described.

According to step 21 two threads, an input thread 201 and an output thread 202 are created by the at least one processor 103. The input thread 201 and the output thread 202 are configured to run simultaneously by the at least one processor 103. The input thread 201 and the output thread 202 are configured to run independently from each other by the at least one processor 103. The input thread 201 and the output thread 202 are configured to run simultaneously and independently from each other by the at least one processor 103. The input thread 201 is configured to at receive and read at least one video input frame from the at least one video input source 11 via the at least one video input card 105 by the at least one processor 103. The input thread 201 is configured by the at least one processor 103 to send the content of the at least one video input frame to the output thread 202 for drawing to the at least one video output display 12 as out frames. Correspondingly, the output thread 202 is configured by the at least one processor 103 to receive the content of the at least one video input frame from the input thread 201 and draw at least one video output frame to the at least one video output display 12 by the at least one GPU 106.

According to step 2011 choosing a manner of splitting the at least one video input frame received from the at least one video input source 11 via the at least one video input frame into a plurality of input slices from $S_{i1}$ to $S_{in}$ where a single input slice is known as $S_{ix}$ is executed on the input thread by the at least one processor 103. There are different ways to split the at least one video input frame into a plurality of input slices from $S_{i1}$ to $S_{in}$ where a single input slice is known as $S_{ix}$. For example, the at least one input frame may be split into video input slices from $S_{i1}$ to $S_{in}$ where each single input slice $S_{ix}$ contains M horizontal lines of video. However, it is not required for the plurality of input slices from Si1 to Sin to be of same size. Further, the video input slices from $S_{i1}$ to $S_{in}$ do not need to consist of complete horizontal lines of video. It is assumed here that the video input slices from $S_{i1}$ to $S_{in}$ are numbered in the order they are transmitted over a wire: topmost single video input slice $S_{ix}$ is transmitted first and it will get slice number $S_{i1}$ of $S_{i1}$ to $S_{in}$.

According to step 2021 choosing a manner of splitting the at least one video output frame into a plurality of output slices from $S_{o1}$ to $S_{on}$ where a single output slice is known as $S_{ox}$ is executed on the output thread 202 by the at least one processor 103 via the at least one GPU 106. There are different ways to split the at least one video output frame into a plurality of output slices from $S_{o1}$ to $S_{on}$ where a single output slice is known as $S_{ox}$. For example, the at least one output frame may be split into video input slices from $S_{o1}$ to $S_{on}$ where each single input slice $S_{ox}$ contains M horizontal lines of video. However, it is not required for the input slices from $S_{o1}$ to $S_{on}$ to be of same size. Further, the video output slices from $S_{o1}$ to $S_{on}$ do not need to consist of complete horizontal lines of video. Further, the manner of splitting the at least one video output frame into a plurality of output slices from $S_{o1}$ to $S_{on}$ where a single output slice is known as $S_{ox}$ may be different on the output thread 202 than on the input thread 201.

Process on the input thread 201 is further described in steps 2012-2015. According to step 2012 a start time and an end time for each single input slice $S_{ix}$ of input slices $S_{i1}$ to $S_{in}$ of the at least one input frame received from the at least one video input card 105 is calculated by the at least one processor 103 on the input thread 201. Calculating the start time and the end time for each single input slice $S_{ix}$ of input slices $S_{i1}$ to $S_{in}$ of the at least one input frame received from the at least one video input card 105 is executed by the at least one processor 103 on the input thread 201 and further comprises calculating the start time and the end time of each single input slice $S_{ix}$ of input slices $S_{i1}$ to $S_{in}$ of the at least one input frame within a period of the at least one video input frame. Advantageously, some video input cards 105 also provide exact information on what image line the input signal is currently going and this can be used to wait until a single video input slice $S_{ix}$ is complete.

According to step 2013 vertical blanking interval for the at least one video input card 105 is located by the at least one processor 103 on the input thread 201. There are several ways to locate vertical blanking interval for both the input thread 201 side and the output thread 202 side. If the computer video processing system 10 is genlocked it is known that vertical blanking interval both for the input thread 201 side and the output thread 202 side will happen at same time. In such case if vertical blanking interval can be recognized either on the input thread 201 side or the output thread 202 side, then it will be known for both the input thread 201 and the output thread 202. Input vertical blanking interval detection depends on drivers capabilities of the at least one video input card 105. At least an approximate vertical blanking interval time can be detected by recording a timestamp when the driver notifies that the next video input frame is ready or when capturing the next video input frame is complete and then adding empirically tested constant to the timestamp.

According to step 2014 at least one single input slice $S_{ix}$ of input slices from $S_{i1}$ to $S_{in}$ is received from the at least one video input card 105 by the at least one processor for the at least one GPU 106 on the input thread 201. Further, the received at least one single input slice $S_{ix}$ is sent to the output thread 202 by the processor until all input slices from $S_{i1}$ to $S_{in}$ have been received and sent to the output thread 202. Advantageously, a single input slice $S_{ix}$ of input slices from $S_{i1}$ to $S_{in}$ is received from the at least one video input card 105 by the at least one processor for the at least one GPU

106 on the input thread 201. More advantageously, the received single input slice $S_{ix}$ is sent to the output thread 202 before another received single input slice $S_{ix}$ is sent to the output thread 202 by the at least one processor 103 until all input slices from $S_{i1}$ to $S_{in}$ have been received and sent to the output thread 202. In other words, each single input slice $S_{ix}$ is sent to the output thread 202 one by one by the at least one processor 103 until all input slices from $S_{i1}$ to $S_{in}$ have been received and sent to the output thread 202.

The input thread 201 keeps running by the at least one processor 103 as long as at least one video input frame is to be received from the at least one video input source 11 via the at least one video input card 105. If there is no longer at least one video input frame to be received from the at least one video input source 11 via the at least one video input card 105, then step 2015 is taken and the input thread 201 can be stopped.

Process on the output thread 202 is described in steps 2022-2028. According to step 2022 a start time and an end time for each output slice $S_{Ox}$ of $S_{O1}$ to $S_{On}$ for the at least one GPU 106 is calculated by the at least one processor 103 on the output thread 202. The start time and the end time for each output slice $S_{Ox}$ of $S_{O1}$ to $S_{On}$ for the at least one GPU 106 is calculated by the at least one processor 103 on the output thread 202 and further comprises calculating the start time and the end time of each single output slice $S_{ox}$ of output slices $S_{o1}$ to $S_{on}$ of the at least one video output frame within a period of the at least one video output frame.

According to step 2023 the at least one GPU 106 is configured to draw directly to a front buffer by the at least one processor 103. The at least one GPU 106 is configured to draw directly to a front buffer by the at least one processor 103 so that no buffering of one or more video output frames can increase latency by at least one processor 103. In other words, the at least one GPU 106 is configured to draw directly to a front buffer by the at least one processor 103 to prevent buffering of output frames and thereby increasing latency. In the computer video processing system 10, the one or more video output frames stored in the front buffer are the one or more video output frames that will be sent over the wire by the at least one GPU 106 to be displayed on the at least one video output display 12. In the computer video processing system 10, each output slice $S_{Ox}$ of $S_{O1}$ to $S_{On}$ stored in the front buffer is the output slice $S_{Ox}$ of $S_{O1}$ to $S_{On}$ that will be next transferred over wire to be displayed on on the at least one video output display 12. More generally, in the computer video processing system 10, data stored in the front buffer is the data that will be next displayed on the at least one video output display 12. The front buffer is also known as visible front buffer.

According to step 2024 a required latency is calculated on the basis of positioning the at least one video input frame within the at least one video output frame by the at least one processor 103. Calculating the required latency is needed if there is a possibility that the positioning of the at least one video input frame is changed in corresponding at least one video output frame. For example, a simplified example can be given if a situation where the at least one video input frame is rotated from 0 degrees to 90 degrees.

According to step 2025 a vertical blanking interval is located for the at least one GPU 106 by the at least one processor 103. There are several ways to locate vertical blanking interval for both the input thread 201 side and the output thread 202 side. If the computer video processing system 10 is genlocked it is known that vertical blanking interval both for the input thread 201 side and the output thread 202 side will happen at same time. In such case if vertical blanking interval can be recognized either on the input thread 201 side or the output thread 202 side, then it will be known for both the input thread 201 and the output thread 202. On the output thread 202 side, when using double buffering glSwapBuffers in OpenGL can be used, for example. Further glFinish enables to wait until vertical blanking interval has started. GLX_NV_delay_before_swap OpenGL extension can be used to wait until a specific point of time within a single video output frame. This can be applied to wait for appropriate position within the at least one video output frame and thus also to calculate the vertical blanking interval's position. There is similar functionality available in other APIs as well.

According to step 2026 running a drawing loop is launched by the at least one processor 103. Receiving the at least one single input slice $S_{ix}$ of $S_{i1}$ to $S_{in}$ sent from the input thread 201 launches the drawing loop by the at least one processor 103. This is described in relation to FIGS. **2*b* and 2*c*** further below.

When the drawing loop is ended, step 2027 or 2028 is taken by the at least one processor 103. Step 2027 is taken by the processor 103 if there is a need to update the required latency. The required latency may needs to be updated if positioning of at least one video input frame within at least one video output frame has been changed. In such case step 2025 may also be returned by at least one processor 103.

By step 2028 the process is concluded.

FIG. **2*b* shows an exemplary flow chart representing a sub-set of method steps according to the invention for the drawing loop on the output thread 202. References to the components of the set-up according to FIGS. 1 and 2*a* are made. The drawing loop is launched according to step 2026. The drawing loop is launched when the output thread 202 receives the at least one single input slice $S_{ix}$ of $S_{i1}$ to $S_{in}$ sent from the input thread 201 by the at least one processor 103. In step 20261 a sub-set of the input slices from $S_{i1}$ to $S_{in}$ required for drawing output slices $S_{O1}$ to $S_{On}$ is calculated by the at least one processor 103 on the output thread 202 on the basis of positioning of the at least one video input frame within the at least one video output frame. It should be noticed that when a single output slice $S_{ox}$ of the output slices from $S_{O1}$ to $S_{On}$ is being sent over wire to the at least one video output display 12 by the at least one GPU 106, then drawing at least the next single output slice $S_{ox+1}$ needs to be completed for the at least one GPU 106 by the at least one processor 103 before the at least one GPU 106 has finished sending the single output slice $S_{ox}$ of the output slices from $S_{O1}$ to $S_{On}$ over the wire to the at least one video output display 12. Thus, a required at least one input slice $S_{iy}$, wherein y is from 1 to n, comprising one or more input slices of the plurality of input slices from Si1 to Sin for drawing output slices $S_{O1}$ to $S_{On}$ by the at least one GPU 106 is calculated on the output thread 202 by the at least one processor 103** on the basis of positioning of the at least one video input frame within the at least one video output frame.

In step 20262 the process is set to wait until the input thread 201 has received all the input slices from $S_{i1}$ to $S_{in}$ from the at least one video input card 105 by the at least one processor 103. The required at least one input slice $S_{iy}$, wherein y is from 1 to n, comprising one or more input slices of the plurality of input slices from Si1 to Sin for drawing output slices $S_{O1}$ to $S_{On}$ by the at least one GPU 106 was identified in step 20261.

In step 20263 the required at least one input slice $S_{iy}$ for drawing the output slices $S_{O1}$ to $S_{On}$ for the at least one GPU 106 is drawn by the at least one processor 103. Namely, the required at least one input slice $S_{iy}$, wherein y is from 1 to n, comprising one or more input slices of the plurality of input slices from Si1 to Sin for drawing the output slices $S_{O1}$ to $S_{On}$ for the at least one GPU 106 are drawn by the at least one processor 103. When another output slice $S_{Ox+1}$ is drawn by the at least one processor 103 for the at least one GPU 106, background content for the output slice $S_{Ox+1}$ is drawn first. Then, the required at least one input slice $S_{iy}$ for drawing the output slice $S_{Ox+1}$ are drawn by the at least one processor 103 for the at least one GPU 106. Next, foreground content for the output slice $S_{O+1}$ is drawn by the at least one processor 103 for the at least one GPU 106. Drawing the background content, the required at least one input slice $S_{iy}$ and the foreground content can be combined in one pass. However, drawing the background content, the required at least one input slice $S_{iy}$ and the foreground content needs to be completed before the at least one GPU 106 starts sending out slice $S_{Ox+1}$ over the wire to the at least one video output display 12.

In step 20264 the output thread 202 keeps running by the at least one processor 103 until the at least one GPU 106 has completed generating output signal to the at least one video output display 12. Advantageously, the output thread 202 keeps running by the at least one processor 103 until the at least one GPU 106 has sent all the output slices from $S_{O1}$ to $S_{On}$ corresponding the required at least one input slice $S_{iy}$, wherein y is from 1 to n. comprising one or more input slices of the plurality of input slices from Si1 to Sin to the at least one video output display 12. Correspondingly, the step 20263 is repeated until the output slices from $S_{O1}$ to $S_{On}$ have been drawn to all the input slices $S_{i1}$ to $S_{in}$ by the at least one processor 103.

Thus, according to steps 20263 and 20264 together, the required input slices $S_{i1}$ to $S_{in}$ for the output slices $S_{O1}$ to $S_{On}$ are drawn by the at least one processor 103 for the at least one GPU 106 where a single output slice $S_{ox+1}$ consisting of the required input slices from $S_{i1}$ to $S_{in}$ is drawn before the at least one GPU 106 completes sending a single output slice $S_{ox}$ of output slices from $S_{O1}$ to $S_{On}$ corresponding the required at least one input slice $S_{iy}$ to the at least one video output display 12 until the last output slice $S_{on}$ corresponding the required at least one input slice $S_{iy}$ is sent by the at least one GPU 106 to the at least one video output display 12.

Advantageously, according to steps 20263 and 20264 together, the required input slices $S_{i1}$ to $S_{in}$ for output slices $S_{O1}$ to $S_{On}$ are drawn by the at least one processor 103 for the at least one GPU 106 where a single output slice $S_{ox+1}$ consisting of the required input slices from $S_{i1}$ to $S_{in}$ is drawn by the at least one processor 103 before the at least one GPU 106 completes sending a single output slice $S_{Ox}$ of output slices from $S_{O1}$ to $S_{On}$ corresponding to the required at least one input slice $S_{iy}$ to the at least one video output display 12 until the last output slice $S_{on}$ is sent by the at least one GPU 106 to the at least one video output display 12.

Once the at least one GPU 106 has sent all the output slices from $S_{O1}$ to $S_{On}$ to the at least one video output display 12, step 2027 (described further on FIG. 2_a_) is taken by the at least one processor 103 and the drawing loop is finished on the output thread 202.

Figure 2B:
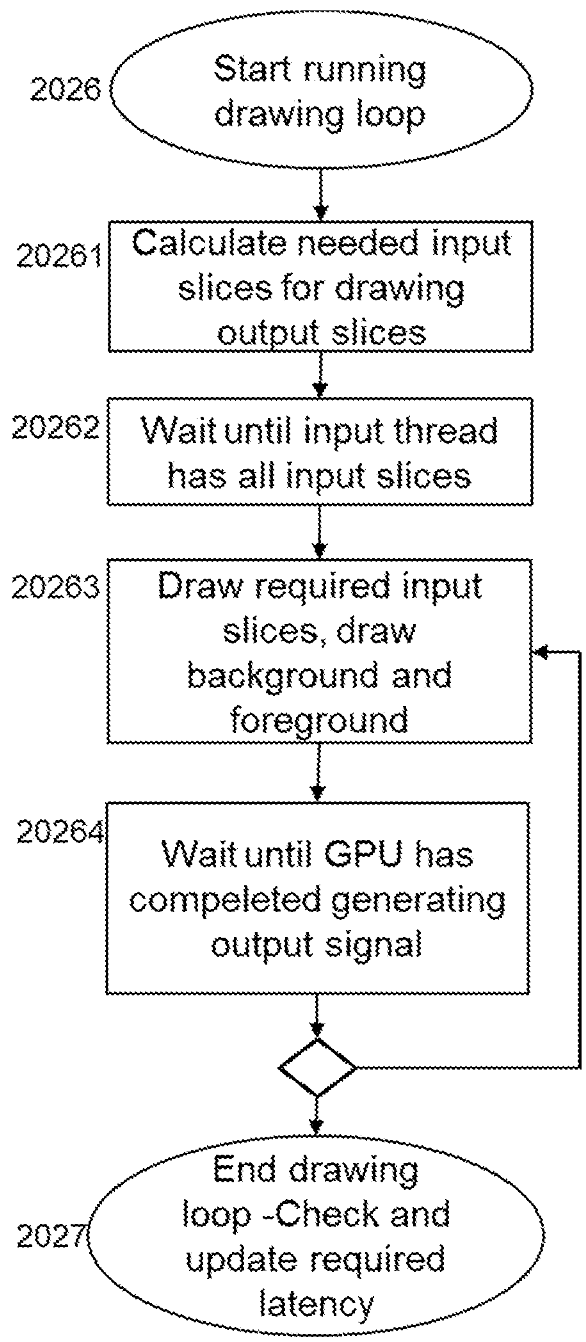
FIG. 2*b* shows an exemplary flow chart representing a sub-set of method steps according to the invention.
Figure 2C:
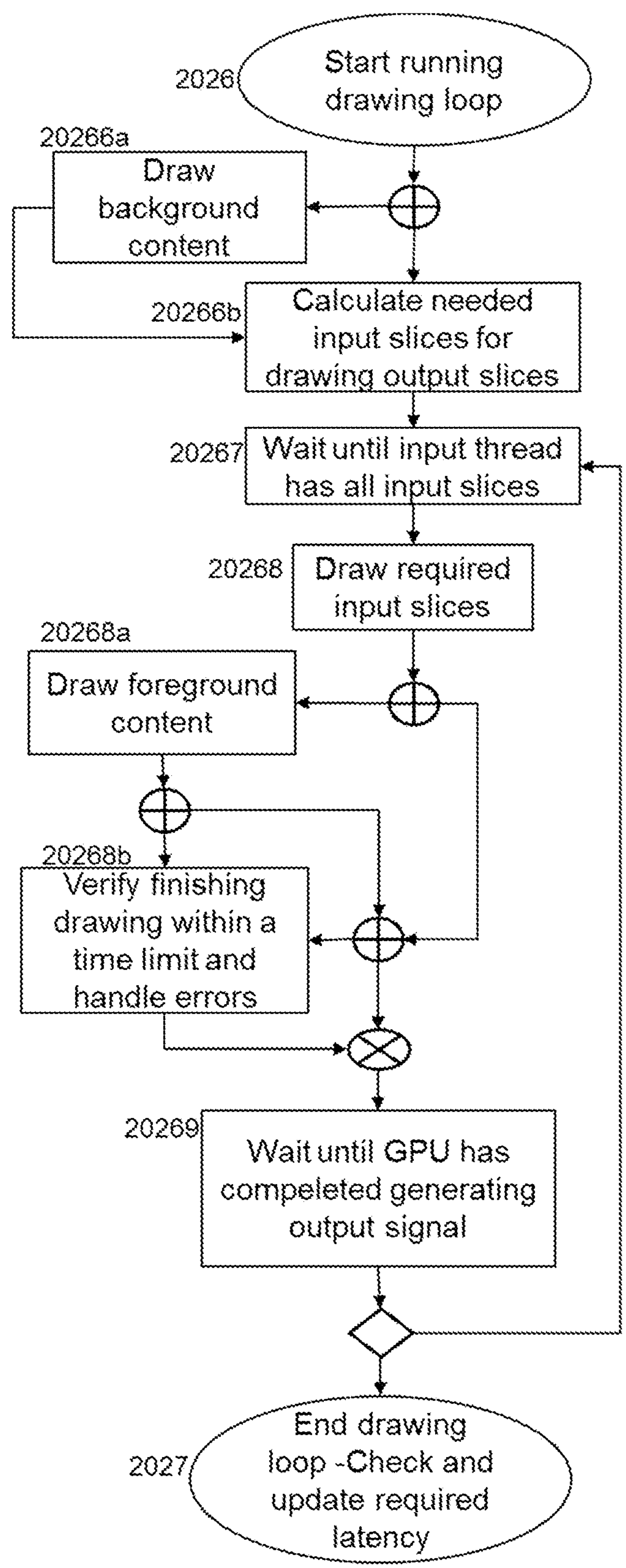
FIG. 2*c* shows an exemplary flow chart representing another sub-set of method steps according to the invention.

FIG. 2_c_ shows an exemplary flow chart representing another sub-set of method steps according to the invention for the drawing loop on the output thread 202. References to the components and method steps of the set-up according to FIGS. 1 and 2_a_ are made. The drawing loop is launched according to step 2026. The drawing loop is launched when the output thread 202 receives the at least one single input slice $S_{ix}$ of $S_{i1}$ to $S_{in}$ sent from the input thread 201 by the at least one processor 103.

According to step 20266_a_ a background content for each output slice $S_{O1}$ to $S_{On}$ is drawn by the at least one processor 103 for the at least one GPU 106 on the front buffer. The background content for each output slice $S_{O1}$ to $S_{On}$ is drawn by the at least one processor 103 for the at least one GPU 106 on the front buffer, if needed. If not needed, step 20266_b_ can be taken directly. The background content may comprise, for example, video, images, graphics or even a desktop. Although the input slices from $S_{i1}$ to $S_{in}$ required for the output slices $S_{O1}$ to $S_{On}$ for the at least one GPU together with background and foreground content of the video input frames may be combined into one pass where everything is drawn at the same time, there are certain advantages if their drawing is separated. Separating drawing the input slices from $S_{i1}$ to $S_{in}$ needed for drawing output slices $S_{O1}$ to $S_{On}$, and drawing the background and the foreground content of the video input frames into three steps will provide some extra time as the background content can be drawn while the output thread 202 is still waiting for the input thread 201 to get all the input slices from $S_{i1}$ to $S_{in}$.

As an example of possible practical implementation only, the background content is to be rendered offscreen into a Frame Buffer Object (FBO) by another lower priority thread run by the at least one processor 103 and then just copied to the front buffer in this pass. FBOs are OpenGL Objects, which allow for the creation of user-defined Frame Buffers and with them, one can render to non-Default Frame Buffer locations, and thus render without disturbing the main output display. Multiple FBOs can be used to do double or even triple buffering to allow for variations in processing time. It should be noted that required latency for background content is much higher than the latency of the input content processing.

The separated drawing of the input slices from $S_{i1}$ to $S_{in}$ needed for drawing output slices $S_{O1}$ to $S_{On}$, and drawing the background and the foreground content of the video input frames may be done, for example, with 2d composited traditional video content. It may also be done with complex 3d scenes but it is more complicated especially if we use multiple inputs.

In step 20266_b_ a sub-set of the plurality of input slices from Si1 to Sin required for drawing output slices $S_{O1}$ to $S_{On}$ for drawing output slices $S_{O1}$ to $S_{On}$ is calculated by the at least one processor 103 on the output thread 202 on the basis of positioning of the at least one video input frame within the at least one video output frame. It should be noticed that when a single output slice $S_{ox}$ of the output slices from $S_{O1}$ to $S_{On}$ is being sent over wire to the at least one video output display 12 by the at least one GPU 106, then drawing at least the next single output slice $S_{ox+1}$ needs to be completed for the at least one GPU 106 by the at least one processor 103 before the at least one GPU 106 has finished sending the single output slice $S_{ox}$ of the output slices from $S_{O1}$ to $S_{On}$ over the wire to the at least one video output display 12. Thus, a required at least one input slice $S_{iy}$, wherein y is from 1 to n, comprising one or more input slices of the plurality of input slices from Si1 to Sin for drawing output slices $S_{O1}$ to $S_{On}$ by the at least one GPU 106 are calculated on the output thread 202 by the at least one processor 103 on the basis of positioning of the at least one video input frame within the at least one video output frame.

In step 20267 the process is set to wait until the input thread 201 has received all the input slices from $S_{i1}$ to $S_{in}$ from the at least one video input card 105 by the at least one processor 103. All the required at least one input slice $S_{iy}$, wherein y is from 1 to n, comprising one or more input slices of the plurality of input slices from Si1 to Sin for drawing output slices $S_{O1}$ to $S_{On}$ by the at least one GPU 106 were identified in step 20266*b*.

In step 20268 the required at least one input slice $S_{iy}$, wherein y is from 1 to n, of the plurality of input slices from Si1 to Sin for drawing the output slices $S_{O1}$ to $S_{On}$ for the at least one GPU 106 is drawn by the at least one processor 103. Advantageously, the required at least one input slice $S_{iy}$ comprising one on more input slices of the plurality of input slices from Si1 to Sin for the output slices $S_{O1}$ to $S_{On}$ for the at least one GPU 106 are drawn by the at least one processor 103. In other words drawing of single output slice $S_{ox}$ consisting of the required at least one input slice $S_{iy}$, wherein y is from 1 to n, comprising one on more input slices of the plurality of input slices from Si1 to Sin needs to be completed by the at least one processor 103 before the at least one GPU 106 starts sending a single output slice $S_{ox}$ over wire to the at least one video output display 12. Further, when an output slice $S_{Ox+1}$ is drawn by the at least one processor 103 for the at least one GPU 106, the required at least one input slice $S_{iy}$ for drawing the output slice $S_{Ox+1}$ by the at least one processor 103 for the at least one GPU 106 may be drawn after drawing the background content according to step 20266*a*. When an output slice $S_{Ox+1}$ is drawn by the at least one processor 103 for the at least one GPU 106, drawing the required at least one input slice $S_{iy}$ needs to be completed before the at least one GPU 106 starts sending out slice $S_{Ox+1}$ over the wire to the at least one video output display 12.

After step 20268 step 20268*a* or step 20268*b* or both steps 20268*a* and 20268*b* may be taken by the at least one processor 103. However, it is also possible to proceed directly to step 20269 by the at least one processor 103.

Step 20268*a* can be taken in order to draw the foreground content by the at least one processor 103. According to step 20268*a* the foreground content for each output slice from $S_{o1}$ to $S_{on}$ is drawn by the at least one processor 103 on the front buffer. The foreground content for each output slice $S_{o1}$ to $S_{on}$ is drawn by the at least one processor 103 on the front buffer, if needed. When an output slice $S_{Ox+1}$ is drawn by the at least one processor 103 for the at least one GPU 106, the foreground content for the output slice $S_{Ox+1}$ may be drawn by the at least one processor 103 for the at least one GPU 106. When an output slice $S_{Ox+1}$ is drawn by the at least one processor 103 for the at least one GPU 106, the foreground content for the output slice $S_{Ox+1}$ may be drawn by the at least one processor 103 for the at least one GPU 106 after drawing the required at least one input slice $S_{iy}$ comprising one on more input slices of the plurality of input slices from Si1 to Sin for drawing the output slice $S_{Ox+1}$ by the at least one processor 103 for the at least one GPU 106. Drawing the foreground content needs to be completed before the at least one GPU 106 starts sending out slice $S_{Ox}$+1 over the wire to the at least one video output display 12. As explained in connection with step 20266*a*, this embodiment has certain advantages. After step 20268*a* step 20268*b* may be taken by the at least one processor 103. However, it is also possible to proceed directly to step 20269 by the at least one processor 103.

Step 20268*b* can be taken in order to verify that drawing of the background content or the foreground content has been finished with an allowed time limit by the at least one processor 103. Further, step 20268*b* can be taken in order verify that drawing of the input slices from $S_{i1}$ to $S_{in}$ required for the output slices $S_{O1}$ to $S_{On}$ for the at least one GPU 106 has been finished with an allowed time limit by the at least one processor 103. Also, in all previous cases, errors in the drawing may be handled here. The allowed time limit is defined by timing when the at least one GPU starts 106 sending the single output $S_{ox}$ of the output slices from $S_{o1}$ to $S_{on}$ corresponding the required at least one input slice $S_{iy}$, wherein y is form 1 to n, comprising one on more input slices of the plurality of input slices from Si1 to Sin to the at least one video output display 12. If the at least one GPU 106 starts sending the single output slice $S_{ox}$ of the output slices from $S_{o1}$ to $S_{on}$ to the at least one video output display 12 before drawing the background content, the foreground content and/or the required at least one input slice $S_{iy}$ of the plurality of input slices from Si1 to Sin corresponding to the single output $S_{ox}$ of the output slices from $S_{o1}$ to $S_{on}$ is completed, then the allowable time limit has been exceeded.

In step 20269 the output thread 202 keeps running by the at least one processor 103 until the last output slice $S_{on}$ corresponding to the required at least one input slice $S_{iy}$ is sent by the at least one GPU 106 to the at least one video output display 12. Advantageously, the output thread 202 keeps running by the at least one processor 103 until the last output slice $S_{on}$ corresponding to the required at least one input slice $S_{iy}$, wherein y is from 1 to n, comprising one or more of the plurality of input slices from Si1 to Sin is sent by the at least one GPU to the at least one video output display 12. Correspondingly, the step 20267 and the possible next steps are repeated until the output slices from $S_{O1}$ to $S_{On}$ have been drawn to all the input slices $S_{i1}$ to $S_{in}$ by the at least one processor 103.

According to steps 20268 and 20269 together the required input slices $S_{i1}$ to $S_{in}$ for the output slices $S_{O1}$ to $S_{On}$ are drawn by the at least one processor 103 for the at least one GPU 106 where a single output slice $S_{ox+1}$ consisting of the required input slices from $S_{i1}$ to $S_{in}$ is drawn before the at least one GPU 106 completes sending a single output slice $S_{ox}$ of output slices from $S_{O1}$ to $S_{On}$ corresponding to the required at least one input slice $S_{iy}$ to the at least one video output display 12 until the last output slice $S_{on}$ corresponding to the required at least one input slice $S_{iy}$ is sent by the at least one GPU 106 to the at least one video output display 12.

Advantageously, according to steps 20268 and 20269 together, the required input slices $S_{i1}$ to $S_{in}$ for output slices $S_{O1}$ to $S_{On}$ are drawn by the at least one processor 103 for the at least one GPU 106 where a single output slice $S_{ox+1}$ consisting of the required input slices from $S_{i1}$ to $S_{in}$ is drawn by the at least one processor 103 before the at least one GPU 106 completes sending a single output slice $S_{ox}$ of output slices from $S_{O1}$ to $S_{On}$ corresponding to the required at least one input slice $S_{iy}$ to the at least one video output display 12 until the last output slice $S_{on}$ is sent by the at least one GPU 106 to the at least one video output display 12.

Once the at least one GPU 106 has sent all the output slices from $S_{O1}$ to $S_{On}$ corresponding to the input slices $S_{i1}$ to $S_{in}$ to the at least one video output display 12, step 2027 (described further on FIG. 2*a*) is taken by the at least one processor 103 and the drawing loop is finished on the output thread 202.

Any of the steps described or illustrated herein may be implemented using executable instructions in a general-purpose or special-purpose processor and stored on a computer-readable storage medium (e.g., disk, memory, or the like) to be executed by such a processor. References to 'computer-readable storage medium' and 'computer' should be understood to encompass specialized circuits such as field-programmable gate arrays, application-specific integrated circuits (ASICs), USB flash drives, signal processing devices, and other devices.

Some advantageous embodiments according to the invention were described above. The invention is not limited to the embodiments described. The inventional idea can be applied in numerous ways within the scope defined by the claims attached hereto.

The invention claimed is:

1. A computer-implemented method for reducing video latency of a computer video processing system comprising at least one video input source, at least one processor, at least one memory including a computer program code, at least one video input card, at least one graphics processing unit known as GPU and at least one video output display, the method comprising:

creating an input thread and an output thread by the at least one processor;

configuring the input thread and the output thread to run simultaneously and independently from each other by the at least one processor;

choosing a manner of splitting at least one video input frame received from the at least one video input source via the at least one video input card into a plurality of input slices from $S_{i1}$ to $S_{in}$ where a single input slice is known as $S_{ix}$ by the at least one processor on the input thread; and choosing a manner of splitting at least one video output frame into a plurality of output slices from $S_{O1}$ to $S_{On}$ where a single output slice is known as $S_{ox}$ via the at least one GPU by the at least one processor on the output thread, wherein the method further comprises on the input thread calculating a start time and an end time for each single input slice $S_{ix}$ of the input slices $S_{i1}$ to $S_{in}$ of the at least one input frame received from the at least one video input card by the at least one processor, locating vertical blanking interval for the at least one video input card by the at least one processor, receiving at least one single input slice $S_{ix}$ of the plurality of input slices from $S_{i1}$ to $S_{in}$ from the at least one video input source via the at least one video input card by the at least one processor until all input slices from $S_{i1}$ to $S_{in}$ have been received, and sending the received at least one single input slice $S_{ix}$ to the output thread by the at least one processor until all input slices from $S_{i1}$ to $S_{in}$ have been sent to the output thread; and simultaneously on the output thread calculating a start time and an end time for each output slice $S_{ox}$ of $S_{O1}$ to $S_{On}$ for the at least one GPU by the at least one processor, configuring the at least one GPU to draw directly to a front buffer by the at least one processor, calculating a required latency on the basis of positioning the at least one video input frame within the at least one video output frame by the at least one processor, locating vertical blanking interval for the at least GPU by the at least one processor, receiving the at least one single input slice $S_{ix}$ of the input slices $S_{i1}$ to $S_{in}$ sent from the input thread by the at least one processor, calculating a required at least one input slice $S_{iy}$, wherein y is from 1 to n, comprising at least one of the input slices from $S_{i1}$ to $S_{in}$ for drawing output slices $S_{O1}$ to $S_{On}$ for the at least one GPU by the at least one processor on the basis of positioning of the at least one video input frame within the at least one video output frame, waiting until the input thread has received all the plurality of input slices from $S_{i1}$ to $S_{in}$ from the at least one video input card by the at least one processor; and drawing by the at least one processor the required input slices $S_{i1}$ to $S_{in}$ for the output slices $S_{O1}$ to $S_{On}$ for the at least one GPU where a single output slice $S_{o(x+1)}$ consisting of the required input slices from $S_{i1}$ to $S_{in}$ is drawn before the at least one GPU completes sending a single output slice $S_{ox}$ of output slices from $S_{O1}$ to $S_{On}$ corresponding to the required at least one input slice $S_{iy}$ to the at least one video output display until the last output slice $S_{on}$ corresponding to the required at least one input slice $S_{iy}$ is sent by the at least one GPU to the at least one video output display.

2. The method according to claim 1, wherein the method further comprises calculating on the input thread the start time and the end time for each input slice from $S_{i1}$ to $S_{in}$ of the at least one input frame received from the least one video input source via the at least one video input card by the at least one processor within a period of the at least one video input frame.

3. The method according to claim 2, wherein the method further comprises calculating on the output thread the start time and an end time for each output slice from $S_{o1}$ to $S_{on}$ of the at least one output frame by the at least one processor for the at least one GPU within a period of the at least one video output frame.

4. The method according to claim 1, wherein the method further comprises calculating on the input thread the start time and an end time for each input slice from $S_{i1}$ to $S_{in}$ of the at least one input frame received from the at least one video input source via the at least one video input card by the at least one processor on the basis of information obtained from the at least one video input card.

5. The method according to claim 4, wherein the method further comprises calculating on the output thread the start time and an end time for each output slice from $S_{o1}$ to $S_{on}$ of the at least one output frame by the at least one processor for the at least one GPU on the basis of information obtained from the at least one GPU.

6. The method according to claim 1, wherein the method further comprises on the output thread drawing a background content for each output slice $S_{O1}$ to $S_{On}$ by the at least one processor on the front buffer via the at least one GPU.

7. The method according to claim 6, wherein the method further comprises on the output thread drawing a foreground content for each output slice $S_{O1}$ to $S_{On}$ by the at least one processor on the front buffer via the at least one GPU.

8. The method according to claim 6, wherein the method further comprises on the output thread verifying that drawing is finished within an allowable time limit by the at least one processor wherein the allowable time limit is defined so that if the at least one GPU starts sending the single output slice $S_{ox}$ of the output slices from $S_{o1}$ to $S_{on}$ to the at least one video output display before drawing the background content, the foreground content and/or the required at least one input slice $S_{iy}$ of the plurality of input slices from $S_{i1}$ to $S_{in}$ corresponding to the single output $S_{ox}$ of the output slices from $S_{o1}$ to $S_{on}$ then is completed the allowable time limit has been exceeded.

9. A computer program product on a non-transitory media for reducing video latency of a computer video processing system comprising at least one video input source, at least one processor, at least one memory including a computer program code, at least one video input card, at least one graphics processing unit known as GPU and at least one video output display, the computer program product comprising:

a computer readable code for creating an input thread and an output thread by the at least one processor;

a computer readable code for configuring the input thread and the output thread to run simultaneously and independently from each other by the at least one processor;

a computer readable code for choosing a manner of splitting at least one video input frame received from the at least one video input source via the at least one video input card into a plurality of input slices from $S_{i1}$ to $S_{in}$ where a single input slice is known as $S_{ix}$ by the at least one processor on the input thread; and a computer readable code for choosing a manner of splitting at least one video output frame into a plurality of output slices from $S_{O1}$ to $S_{On}$ where a single output slice is known as $S_{ox}$ via the at least one GPU by the at least one processor on the output thread, wherein the computer program product further comprises a computer readable code for calculating a start time and an end time for each single input slice $S_{ix}$ of the input slices $S_{i1}$ to $S_{in}$ of the at least one input frame received from the at least one video input card by the at least one processor on the input thread, a computer readable code for locating vertical blanking interval for the at least one video input card by the at least one processor on the input thread, a computer readable code for receiving at least one single input slice $S_{ix}$ of the plurality of input slices from $S_{i1}$ to $S_{in}$ from the at least one video input source via the at least one video input card by the at least one processor until all input slices from $S_{i1}$ to $S_{in}$ have been received on the input thread, a computer readable code for sending the received at least one single input slice $S_{ix}$ to the output thread by the at least one processor until all input slices from $S_{i1}$ to $S_{in}$ have been sent to the output thread on the input thread, a computer readable code for calculating a start time and an end time for each output slice $S_{ox}$ of $S_{O1}$ to $S_{On}$ for the at least one GPU by the at least one processor on the output thread, a computer readable code for configuring the at least one GPU to draw directly to a front buffer by the at least one processor on the output thread, a computer readable code for calculating a required latency on the basis of positioning the at least one video input frame within the at least one video output frame by the at least one processor on the output thread, a computer readable code for locating vertical blanking interval for the at least GPU by the at least one processor on the output thread, a computer readable code for receiving the at least one single input slice $S_{ix}$ of the input slices $S_{i1}$ to $S_{in}$ sent from the input thread by the at least one processor on the output thread, a computer readable code for calculating a required at least one input slice $S_{iy}$, wherein y is from 1 to n, comprising at least one of the input slices from $S_{i1}$ to $S_{in}$ for drawing output slices $S_{O1}$ to $S_{On}$ for the at least one GPU by the at least one processor on the basis of positioning of the at least one video input frame within the at least one video output frame on the output thread, a computer readable code for waiting until the input thread has received all the plurality of input slices from $S_{i1}$ to $S_{in}$ from the at least one video input card by the at least one processor on the output thread, and a computer readable code for drawing by the at least one processor the required input slices $S_{i1}$ to $S_{in}$ for the output slices Soi to $S_{on}$ for the at least one GPU where a single output slice $S_{o(x+1)}$ consisting of the required input slices from $S_{i1}$ to $S_{in}$ is drawn before the at least one GPU completes sending a single output slice $S_{ox}$ of output slices from $S_{O1}$ to $S_{On}$ corresponding to the required at least one input slice $S_{iy}$ to the at least one video output display until the last output slice $S_{on}$ corresponding to the required at least one input slice $S_{iy}$ is sent by the at least one GPU to the at least one video output display on the output thread.

10. The computer program product on a non-transitory media according to claim 9, wherein the computer program product further comprises a computer readable code for calculating on the input thread the start time and the end time for each input slice from $S_{i1}$ to $S_{in}$ of the at least one input frame received from the least one video input source via the at least one video input card by the at least one processor within a period of the at least one video input frame.

11. The computer program product on a non-transitory media according to claim 10, wherein the computer program product further comprises a computer readable code for calculating on the output thread the start time and an end time for each output slice from $S_{o1}$ to $S_{on}$ of the at least one output frame by the at least one processor for the at least one GPU within a period of the at least one video output frame.

12. The computer program product on a non-transitory media according to claim 9, wherein the computer program product further comprises a computer readable code for calculating on the input thread the start time and an end time for each input slice from $S_{i1}$ to $S_{in}$ of the at least one input frame received from the least one video input source via the at least one video input cardby the at least one processor on the basis of information obtained from the at least one video input card.

13. The computer program product on a non-transitory media according to claim 12, wherein the computer program product further comprises a computer readable code for calculating on the output thread the start time and an end time for each output slice from $S_{o1}$ to $S_{on}$ of the at least one output frame by the at least one processor for the at least one GPU on the basis of information obtained from the at the at least one GPU.

14. The computer program product on a non-transitory media according to claim 9, wherein the computer program product further comprises a computer readable code for drawing on the output thread a background content for each output slice $S_{O1}$ to $S_{On}$ by the at least one processor on the front buffer via the at least one GPU.

15. The computer program product on a non-transitory media according to claim 14, wherein the computer program product further comprises a computer readable code for drawing on the output thread a foreground content for each output slice $S_{O1}$ to $S_{On}$ by the at least one processor on the front buffer via the at least one GPU.

16. The computer program product on a non-transitory media according to claim 14, wherein the computer program product further comprises a computer readable code for verifying on the output thread that drawing is finished within an allowable time limit by the at least one processor wherein the allowable time limit is defined so that if the at least one GPU starts sending the single output slice $S_{ox}$ of the output slices from $S_{o1}$ to $S_{on}$ to the at least one video output display before drawing the background content, the foreground content and/or the required at least one input slice $S_{iy}$ of the plurality of input slices from $S_{i1}$ to $S_{in}$ corresponding the single output $S_{ox}$ of the output slices from $S_{o1}$ to $S_{on}$ is completed, then the allowable time limit has been exceeded.

* * * * *